No Printed Specification Available
6997X
H. Holland,
Making Wooden Boxes.
Patented Apr. 13, 1832.
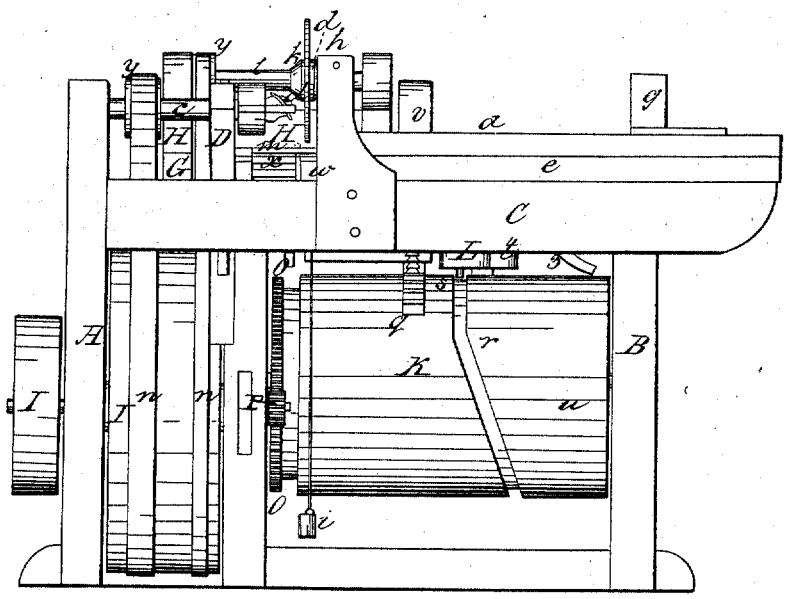
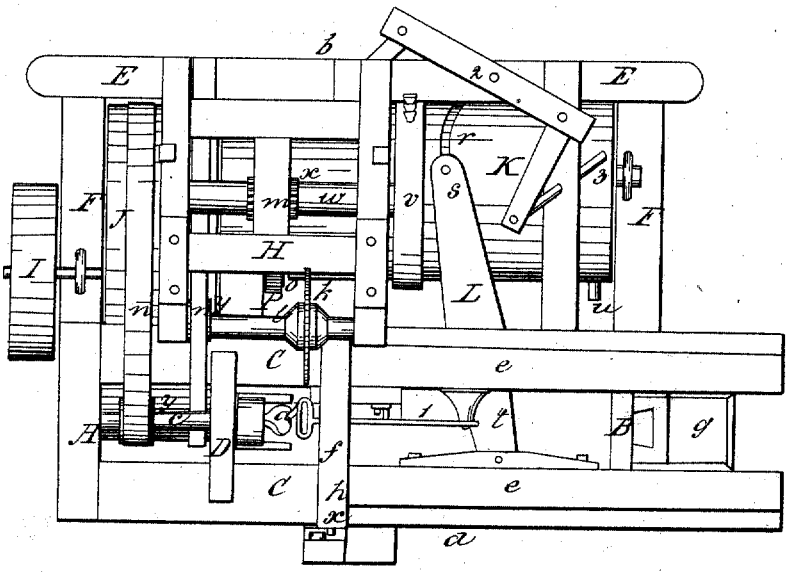
AM. PHOTO-LITHO. CO. N.Y. (OSBORNE'S PROCESS.)

6997X                    apl 13, 1832

Harrison Holland

Letters Patent.

The schedule referred to in these Letters Patent and making part of the same, containing a description in the words of the said Harrison Holland himself of his improvement in the Machine for manufacturing Boxes of Wood.

This machine consists of two parts,– 1st the frame supporting the machinery & 2d the machine itself on the gearing I. of the frame. this is made strong, of firm and solid materials, as in the model, occupying a space of about four by six feet square; and may be conveniently placed in a common shop room, The frame may be better described, by considering it as consisting of a front and back part, the former supporting the auger and timber carriage the latter the saw, and its frame & most of the machinery. — There are two distinct operations to be performed viz. cutting or boring out the box and sawing it off. And the frame is calculated to favour both of these operations The main or front part of the frame, is constructed and consists of the following viz.– 1st a head plank three inches in thickness sixteen in width and four feet and three inches in height marked in the drawing A. 2d a foot plank of the same dimensions and corresponding with the head plank excepting as to length or height this being but three feet long marked B. — 3d two beams, five inches thick and six inches deep placed on opposite sides of the above mentioned planks, tenoned into the head plank, & receiving tenons on the upper end of the foot plank; in the model six feet long; they may be longer if necessary, both are marked C. —

4th a head block. this may be a two inch hard plank, ten inches long six high resting on the beams ten inches from the head plank, having a tongue extending down through, and below the Beams, & confined at bottom by a key or wedge, This may be moved farther 174 69997X Apl. 13, 1832 from or nearer to the hind plank, if necessary. It is the main support of the auger the mandrel of the auger passing through it marked D, this is in two parts; the top part being removable to receive and screwed on to confine the mandrel of the Auger. — 5th an ear, this is a solid piece of wood, two inches thick five inches wide at bottom & two at top. confined to the outer side of the front beam nineteen inches from the front hand plank, running up nine inches above the beam, On the beams the timber carriage so called to destinguish [illegible] and [illegible]. This in the model is five feet long but may be any given length to accomodate the length of the timber.

This is made of solid wood, two inches deep and five inches wide corresponding with the tops of the beams viz, such are the side pieces - these are tenoned into ~~in~~ the head block and confined by ties, or rather connected by ties —

On each of these is fastened a cleat so as to form a groove on each side, in which a foot block is placed. The timber to be wrought is confined; the forward end in the head block for this purpose the timber should be square corresponding with a square cut out of the head block, the hind end is confined in the foot block and the foot block moves forward, as the timber is shortened drawn by a weight and pulley, — A section is taken from the upper part of the head block, so as to form a square, this is hung by a joint at one end, and is made to press on the upper part of the timber, so as to confine it having teeth running into the timber. This has been called for distinction a vice, it acts on the principle of a lever, and the power applied is a weight suspended from the other end. All the parts of this carriage as well as of the whole machine will be understood by inspecting the model.

The back part of the frame is firmly united with the other part.

The back side consists of what may be called a sill, plate and three posts The posts are tenoned at each end The outer posts correspond with the hind and foot planks in the front frame the middle post is one foot from the front post. The size of the timber, three inches square. The side marked C. This side is bound
to the front part of the frame by ties entering each post by a tenon and
into the head and foot planks, and an inner post, standing under
and supporting the inner beam and parallel with the middle post
These ties are three inches thick and six inches deep viz. the low
-er ties marked F. made substantial in order to support part
of the machinery, — There are also three ties near the top, the
first six inches from the head plank, the second sixteen further
and the third sixteen inches further still, united to the inner
beam by tenons the upper part projecting and rising as high as
the top of the timber carriage; all these ties two feet in length between joints
and the upper ties marked G, on the two front upper ties is placed
the saw carriage two feet three inches long and nineteen inches wide
the timbers two inches wide and two and one half inches deep firmly
united together by ties near each end. — Between the last mention
-ed ties parallel with the sides of the frame is a cross tie of the
same size having a row of cogs underside uniting with the wheel
which carries the saw frame or carriage On the fore part of this carriage are placed blocks or puppet
heads in which the axle of the saw runs. the saw carriage marked
H .... II of the machinery or gearing. this consists of the following
parts viz. — The driving pulley marked I fifteen inches in diameter
projecting at the head of the machine 2. the first drum three feet in diameter one foot in length run
-ning between the first and second lower ties connecting the two
lower parts of the frame, and on the same axle with the dri
-ving pulley marked J. this carries the band propelling both
the auger and saw, and also the second drum.

3. The second Drum three feet long two feet in diameter
marked K on the head end is a cog wheel twenty inches in
diameter with one hundred and forty cogs, dipping into a
small wheel, one inch and an half in diameter, with ten
cogs, and on the axle of the driving pulley between the two drums this small wheel communicating motion to the same drum On the barrel of this drum near the head, is a row of cogs one third round viz (3) of sufficient length to carry the saw carriage as far forward as necessary also a groove near the centre three quarters of an inch deep described in form of the ecliptic in which plays a cog near the end of the lever hereafter described in such a manner that the revolution of the Drum move forward and back the timber carriage as desired. There is also near the lower end of this drum one cog whose office is to assist in drawing back the saw carriage 4. a semi cog wheel fourteen inches in diameter and two inches thick, running on an axle, whose pivots are fixed in the two front upper ties, on whose axle also is a small cog wheel under the saw carriage communicating with and running in the cogs on the under side of the saw carriage above named, these latter cogs move up the saw carriage, the semi cog wheel recieves its motion from the cogs on the second drum 5th The timber carriage, this is carried forward and back as in course of the operation it becomes necessary in order to bring the timber to be wrought in contact with the augur and to withdraw it when also it is necessary, — This is done by means of a lever which may be a hard piece of timber two inches in thickness by four and four inches wide in the centre reduced about one half at each. This lever hangs and plays on a bolt, on the lower side of the inner beam, near its centre, one end is fastened to the front side of this carriage by means of a strap of iron & bolt attached to the side of the carriage bending down as low as the lower side of the front beam, the other end has a cog in it playing in the eclipticul groove around the second drum this groove is so designed as to apply the power to that end of the lever, in carrying forward and back the carriage as above, the lever playing on the bolt first above mentioned at its fulcrum this lever marked L, 6th The saw which is circular in common form ten inches 631 6997x Apl. 13, 1832 in diameter axle of iron with a pully on the same of the proper size
and proportion. —— 7th The auger, this is a screw auger <u>without
a center</u>, This is claimed as a new invention and may be usefully
applied to other uses, the length and size will be determined
by the size of the machine & the box —

The mandrel of the auger must be at least one half inch
greater in diameter, than the auger in order to receive two cutters
one opposite to the other, these are dovetailed into the head of the
mandrel & brought to an edge so as to cut and smooth the
outside of the box, there is a pully on the mandrel 8. The
bands which may be of leather or chains running on cogs 11th <u>The operation</u>

The power is applied to the driving pully. this puts the whole
in operation, this communicates motion to the first drum & also
to the second drum, the first drum gives motion to the
auger and saw, the second to both the carriages, it moves them up
and back. The timber carriage is moved by means of the lever
described above & the timber in the carriage is moved in this way
viz, when the auger has done its work, and the carriage begins
to draw back a pin in the end of the cap called for distinction
the vice in the head block of the timber carriage over and con
fining the timber presses over a slide like the latch of a door
hung in the inner side of the cap which raises the same and
leaving the timber free, the hind block of the carriage, drawn by
the pully and weight described above then drives the timber forward
till the cap or vice drops and holds it firm again, but least the
timber should be pressed too far forward to the lower side of the
carriage, is fixed an arm of iron, at the end of which near the
auger and at the right angle is fixed a piece of wood thin and
like a knife playing up and down in mortices of iron projecting
forward of the head block, so as to rise forward of the timber and
prevent its going too far, This is raised up by a slide again
the arm passing at the right time over a slide similar to the

[illegible] 6997x Apl 13, 1832 above fastened to a block projecting in the inner side of the inner
frame. — The eliptical circle or groove in the second drum in
which the cog plays, on the end of the lever serves as the power to
move the timber carriage forward and back as required, the saw
carriage is moved forward by the small wheel on the axle of
the same cog wheel. The second drum communicates motion to the
same cog wheel & this by means of the cogs under the middle
piece of the carriage and the small wheel just mentioned the
carriage is pushed forward bringing the saw to the timber
after it has performed its work and the box sawed off. the car
-riage is pulled back again to make way for the cutting operation
by the auger by means of a lever turning on a pivot at its centre
as a fulcrum resting on the plate one end attached to the hinder
part of the carriage the other to a reach, & the reach hung on a
crank passing through the third upper [illegible] down to the second
drum & then turned by means of the cog on the same this is
graduated and proportioned so as to have this draw the saw and carriage
back just in time Remarks. 1st The dimensions and proportions
above mentioned are assumed as proper and yet they may be
varied if necessary, — — 2. boxes of different sizes may
be made by this machine, 3, the lids may be made in
the same way, the auger however may be proportionally
shorter and the slides moved proportionally nearer the head of
the carriage, — 4 boxes may be prepared for the lids by sliding
them on to the mandrel of a common turning lathe and guag-
ing the cutting tool or turning chisel having the same in end
shape as desired. 5. the power may be applied by water
or steam or any adequate means. — 6th.
The timber to be worked should be sawn square of the
size of the box, and may be as long as the carriage will admit. Green timber
is equally good as that which is seasoned,

[illegible] Witnesses Samuel S [illegible] } Harrison Hollard
Frederick [illegible] }
2225 [illegible]